US009315176B2

(12) United States Patent  
Ando et al.

(10) Patent No.: US 9,315,176 B2
(45) Date of Patent: Apr. 19, 2016

(54) ASSESSMENT SUPPORT PROGRAM AND ASSESSMENT SUPPORT DEVICE FOR AUTOMATIC BRAKING SYSTEM

(71) Applicant: Independent Administrative Institution National Traffic Safety and Environment Laboratory, Tokyo (JP)

(72) Inventors: Kenichi Ando, Tokyo (JP); Nobuhisa Tanaka, Tokyo (JP)

(73) Assignee: INDEPENDENT ADMINISTRATIVE INSTITUTION NATIONAL TRAFFIC SAFETY AND ENVIRONMENT LABORATORY, Tokyo (JP)

( * ) Notice: Subject to any disclaimer, the term of this patent is extended or adjusted under 35 U.S.C. 154(b) by 0 days.

(21) Appl. No.: 14/667,828

(22) Filed: Mar. 25, 2015

(65) Prior Publication Data

US 2015/0274145 A1 Oct. 1, 2015

(30) Foreign Application Priority Data

Mar. 28, 2014 (JP) .................................. 2014-067911

(51) Int. Cl.
*G06F 7/70* (2006.01)
*G06F 19/00* (2011.01)
*G06G 7/00* (2006.01)
*G06G 7/76* (2006.01)
*B60T 7/22* (2006.01)

(52) U.S. Cl.
CPC ............. *B60T 7/22* (2013.01); *B60T 2201/022* (2013.01)

(58) Field of Classification Search
CPC .......... B60T 8/1755; B60T 8/172; B60T 7/22; B60W 10/184; B60W 10/18
USPC ........................................................... 701/70
See application file for complete search history.

(56) References Cited

FOREIGN PATENT DOCUMENTS

JP 2007-62604 A 3/2007

OTHER PUBLICATIONS

An Evaluation Protocol for Collision Avoidance and Mitigation Systems and its Application to Safety Estimation (Fourth Report), Proceedings No. 125-13 of Academic Meeting by Society of Automotive Engineers of Japan, Inc. with English translation and Verification of Translation, Kenichi Ando and Nobuhisa Tanaka, Oct. 24, 2013 (13 pages).

*Primary Examiner* — Maceeh Anwari
(74) *Attorney, Agent, or Firm* — Flynn, Thiel, Boutell & Tanis, P.C.

(57) ABSTRACT

An assessment support program for an automatic braking system is executed by a computer having at least a CPU. The CPU functions as a part that constitutes an assessment unit that makes an assessment of the performance of the automatic braking system on the basis of a significance probability relating to a probability distribution. The probability distribution is obtained by a logistic regression analysis based on a test result. The test result indicates whether or not a vehicle equipped with the automatic braking system collides with an obstacle under actuation of the automatic braking system. An explanatory variable in the logistic regression analysis is a relative speed vi of the vehicle relative to the obstacle before the actuation of the automatic braking system. A response variable in the logistic regression analysis is an occurrence probability of an event in the test result.

18 Claims, 9 Drawing Sheets

Fig. 6
(A) 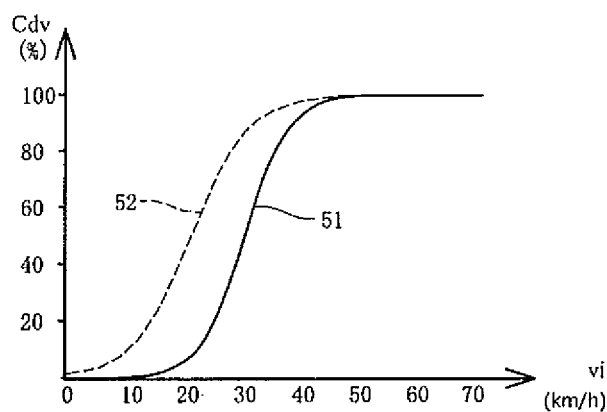
(B) 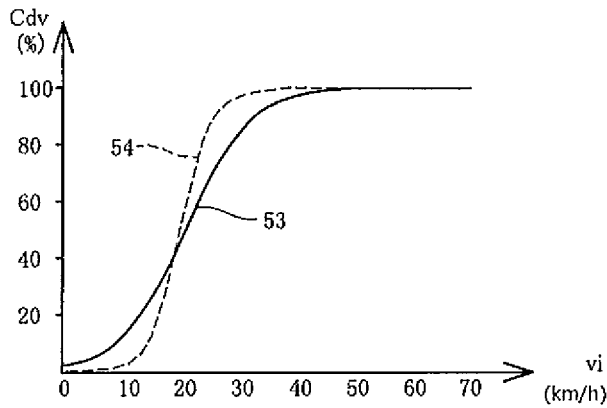
(C) 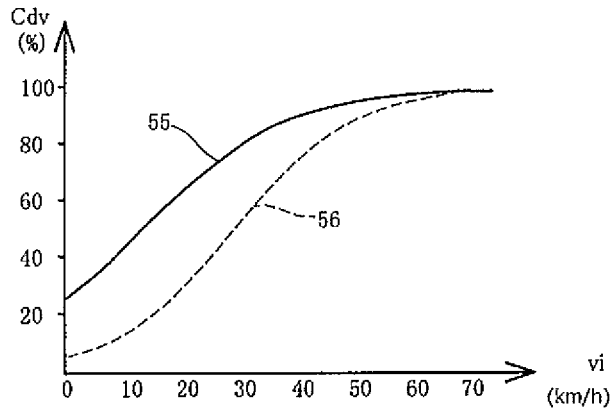

Fig. 10
(A)
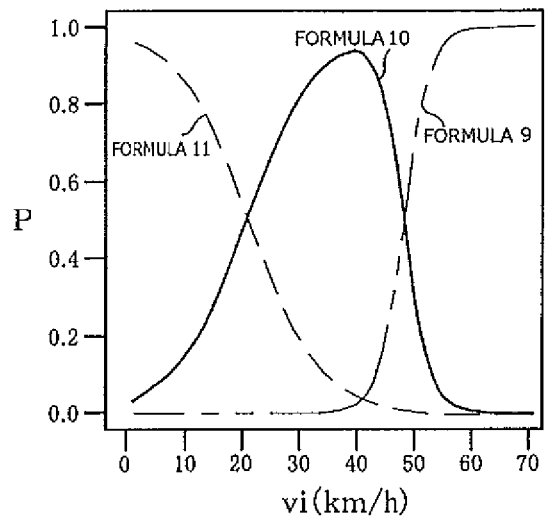
(B)
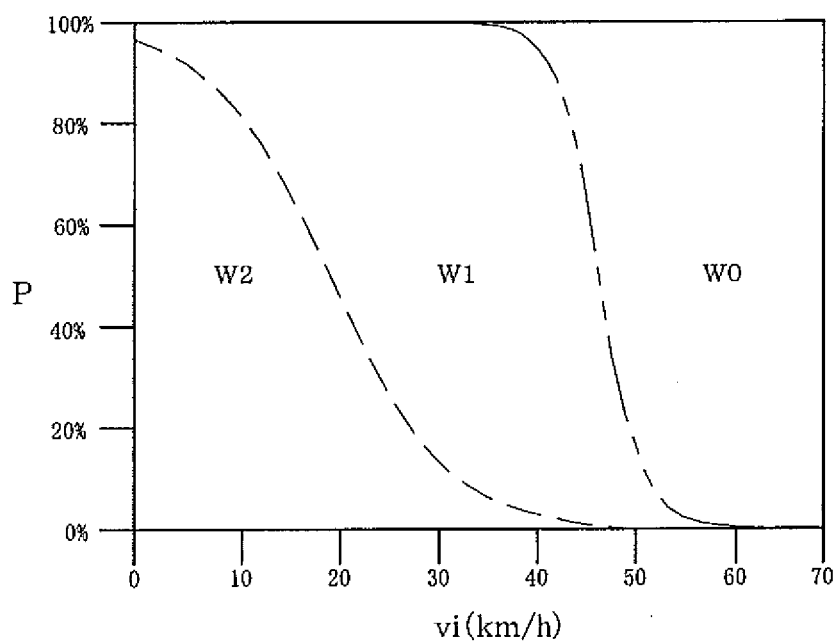

ASSESSMENT SUPPORT PROGRAM AND ASSESSMENT SUPPORT DEVICE FOR AUTOMATIC BRAKING SYSTEM

BACKGROUND OF THE INVENTION

1. Field of the Invention

The present invention relates to an assessment support program and an assessment support device for automatic braking systems.

2. Description of the Related Art

Automatic braking systems are installed in vehicles to avoid a collision with an obstacle in a driving path by means of automatic actuation of a brake upon detecting the obstacle in front of the vehicle. Such automatic braking systems have a detection unit for detecting an obstacle in a driving path and an actuation unit for actuating the brake upon detection of the obstacle by the detection unit (for example, Japanese Patent Application Laid-Open No. 2007-062604).

By the way, as the detection units employed in the automatic braking systems, there are stereo cameras having a CCD, ones using a millimeter wave radar, ones using an ultrasonic radar, and the like. Also, there are a wide variety of the actuation units employed in the automatic braking systems, for example ones having a constant braking force, ones the braking force of which is appropriately determined in accordance with the speed of the vehicle and the distance from the vehicle to the obstacle, and the like.

On the other hand, one of performance capabilities required of the automatic braking systems is a collision avoidance capability. To make an assessment as to the collision avoidance capability, a method based on the performance of components such as the above-described detection unit and the actuation unit is conceivable. However, this assessment method is applicable to the automatic braking systems of the same type, but is not applicable to the automatic braking systems of different types.

Therefore, it is required to provide a method to assess the performance of the automatic braking systems in a uniform manner irrespective of the types of the automatic braking systems, but such a method has not yet been established.

SUMMARY OF THE INVENTION

The present invention has been made in view of the aforementioned problem. It is an object of the invention to provide an assessment support program and an assessment support device for the automatic braking systems.

The present invention is an assessment support program for an automatic barking system executed by a computer having at least a CPU. The CPU functions as a part that constitutes an assessment unit that makes an assessment of the performance of the automatic braking system on the basis of a significance probability of a predetermined variable. A probability distribution is obtained by a logistic regression analysis based on a result of a test of whether or not a vehicle equipped with the automatic braking system collides with an obstacle under actuation of the automatic braking system. An explanatory variable in the logistic regression analysis is a relative speed vi of the vehicle relative to the obstacle before the actuation of the automatic braking system. A response variable in the logistic regression analysis is an occurrence probability of an event in the result of the test.

The assessment unit preferably assesses that the instability of the automatic braking system decreases with decrease in the significance probability.

The event preferably includes a collision non-occurrence event in which the vehicle does not collide with the obstacle, and a collision occurrence event in which the vehicle collides with the obstacle. The assessment unit preferably makes an assessment of the performance of the automatic braking system on the basis of the significance probability relating to the collision occurrence event. Also, the collision occurrence event preferably includes a first collide occurrence event and a second collide occurrence event, and the assessment unit preferably makes an assessment of the performance of the automatic braking system on the basis of the significance probability relating to the first collision occurrence event or the second collision occurrence event.

The assessment unit preferably assesses the performance of the automatic braking system on the basis of a logarithm of an odds ratio relating to the probability distribution.

The present invention is an assessment support program for an automatic barking system executed by a computer having at least a CPU. The CPU functions as a part that constitutes an assessment unit that makes an assessment of the performance of the automatic braking system on the basis of a logarithm of an odds ratio relating to a probability distribution. The probability distribution is obtained by a logistic regression analysis based on a result of a test of whether or not a vehicle equipped with the automatic braking system collides with an obstacle under actuation of the automatic braking system. An explanatory variable in the logistic regression analysis is a relative speed vi of the vehicle relative to the obstacle before the actuation of the automatic braking system. A response variable in the logistic regression analysis is an occurrence probability of an event in the result of the test.

The CPU preferably functions as a part that constitutes an assessment subject judgment unit that judges whether or not the probability distribution is included in subjects of the assessment on the basis of a significance probability relating to the probability distribution.

The present invention is an assessment support program for an automatic barking system executed by a computer having at least a CPU. The CPU functions as a part that constitutes an assessment subject judgment unit that judges whether or not a probability distribution is included in subjects of an assessment on the basis of a significance probability relating to the probability distribution. The probability distribution is obtained by a logistic regression analysis based on a result of a test of whether or not a vehicle equipped with the automatic braking system collides with an obstacle under actuation of the automatic braking system. An explanatory variable in the logistic regression analysis is a relative speed vi of the vehicle relative to the obstacle before the actuation of the automatic braking system. A response variable in the logistic regression analysis is an occurrence probability of an event in the result of the test.

The assessment subject judgment unit preferably compares the significance probability with a threshold value in magnitude, and preferably excludes the automatic-braking system from the subjects of the assessment in a case where the significance probability is larger than the threshold value.

The assessment subject judgment unit preferably adds magnitude comparison result information, which represents a result of the magnitude comparison, to information on the probability distribution, and preferably includes in the subjects of the assessment the probability distributions belonging to the same group, out of the probability distributions sorted into groups on the basis of the magnitude comparison result information.

In an assessment support device for an automatic braking system according to the present invention, the above-described assessment support program for an automatic braking system is installed.

According to the present invention, it is possible to assess various types of automatic braking systems in a uniform manner.

BRIEF DESCRIPTION OF THE DRAWINGS

FIGS. 6A to 6C are graphs showing a distribution of a collision occurrence probability, in which a vertical axis represents an occurrence probability of a collision occurrence event and a horizontal axis represents an initial speed vi, in which a solid line of FIG. 6A is obtained from an experiment 1, a broken line of FIG. 6A is obtained from an experiment 2, a solid line of FIG. 6B is obtained from an experiment 3, a broken line of FIG. 6B is obtained from an experiment 4, a solid line of FIG. 6C is obtained from an experiment 5, and a broken line of FIG. 6C is obtained from an experiment 6;

FIG. 10A is a graph showing a summary of mathematical formulas 9 to 11, in which a vertical axis represents an occurrence probability P and a horizontal axis represents the initial speed vi;

FIG. 10B is a graph showing an integrated value of each occurrence probability P shown in FIG. 10A and a breakdown thereof, in which a vertical axis represents the occurrence probability P and a horizontal axis represents the initial speed vi.

DETAILED DESCRIPTION OF THE PREFERRED EMBODIMENTS

Embodiments of the present invention will now be described below with reference to the accompanying drawings.

Figure 1:
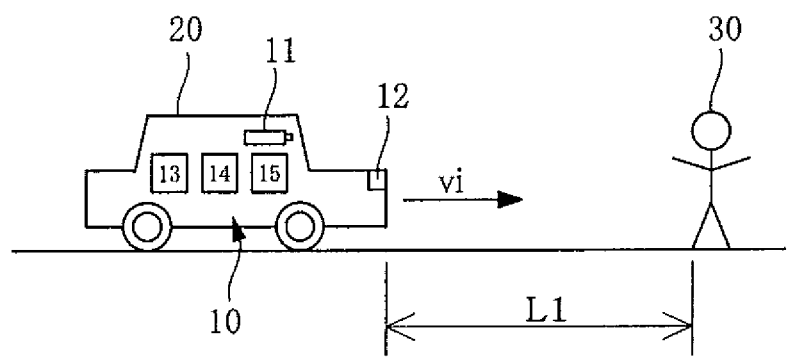
FIG. 1 is an explanatory view showing a summary of the state of operation verification of an automatic braking system.

As shown in FIG. 1, an automatic braking system 10 for automatically braking a vehicle 20 upon detection of an obstacle 30 is installed in the vehicle 20. The obstacle 30 includes a person, an animal, a plant, and other objects (a guardrail, a stone, and the like).

Figure 2:
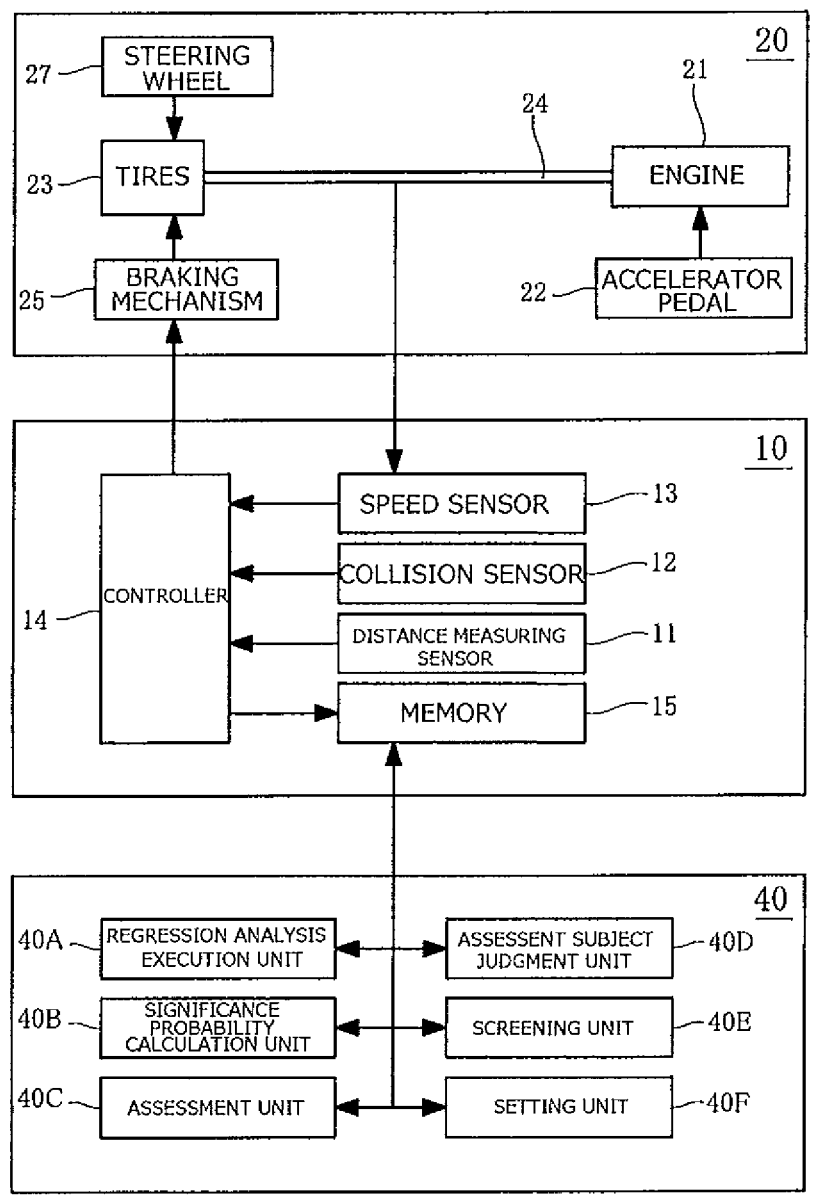
FIG. 2 is an explanatory view showing a summary of the automatic braking system, a vehicle, and an assessment device for the automatic braking system.

As shown in FIG. 2, the vehicle 20 is provided with an engine 21 mounted in a car body (not shown), an accelerator pedal 22 for operating an output of the engine 21, tires 23 driven by the output of the engine 21, a drive shaft 24 for transmitting the output of the engine 21 to the tires 23, a braking mechanism 25 for preventing the rotation of the tires 23, and a steering wheel 27 for regulating the direction of the tires 23. The braking mechanism 25 includes a brake member such as a disc brake or a drum brake, a brake pedal for operating the brake member, and the like.

As shown in FIGS. 1 and 2, the automatic braking system 10 has a distance measuring sensor 11 for measuring a distance L1 between the vehicle 20 and the obstacle 30, a collision sensor 12 provided at a tip of the vehicle 20 to detect a collision with the obstacle 30, a speed sensor 13 for detecting the speed of the vehicle 20, a controller 14 for controlling the respective parts, and memory 15 for storing predetermined values. As the distance measuring sensor 11, any of a radar, a camera (a monocular camera and a stereo camera), a laser, a combination of a radar and a camera, a combination of a radar, a camera, and a laser, and the like is available.

The controller 14 brakes the vehicle 20 on the basis of a sensing signal from the distance measuring sensor 11. To be more specific, the controller 14 judges the presence or absence of the obstacle 30 on the basis of the sensing signal from the distance measuring sensor 11. Furthermore, when the obstacle 30 is judged to be present, the controller 14 calculates TTC (time to collision) on the basis of the distance L1 to the obstacle 30 and a relative speed v to the obstacle 30. The TTC is calculated by L1/v. The controller 14 also controls the braking mechanism 25 on the basis of a calculated value of the TTC. Note that, the controller 14 may operate the steering wheel 27.

As the memory 15, a hard disk drive containing a magnetic disk or the like is available.

Next, a summary of operation verification of the automatic braking system 10 (hereinafter simply called operation verification) will be described.

Figure 3:
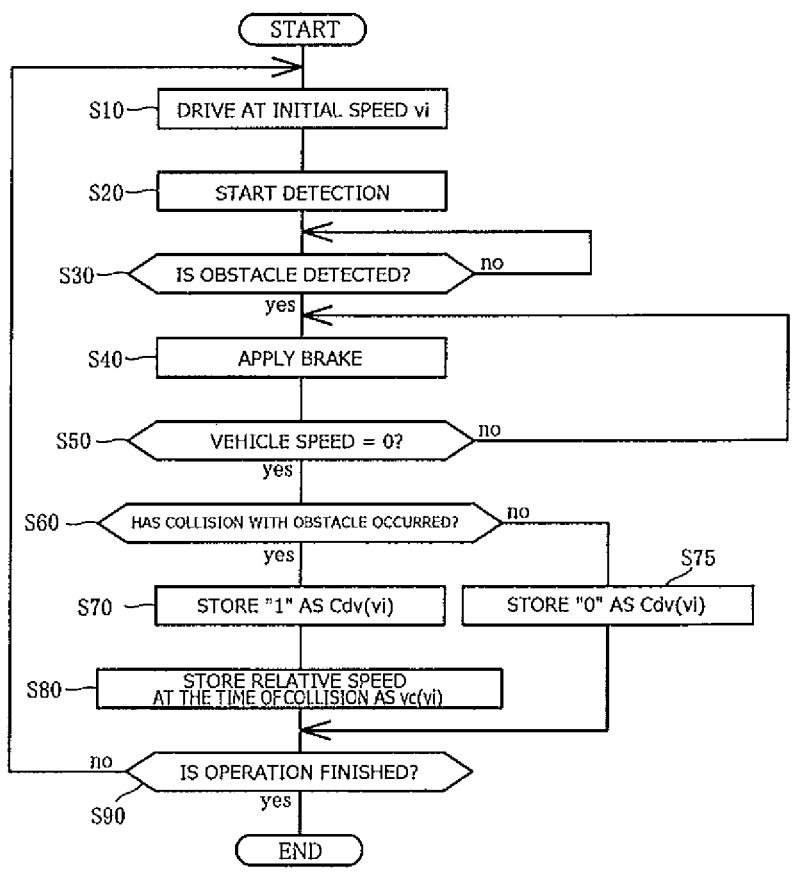
FIG. 3 is a flowchart of the operation verification of the automatic braking system.

The vehicle 20 drives in a predetermined driving path at a constant relative speed to the obstacle 30 (S10 of FIG. 3). At this time, a driver manually or the controller 14 automatically steers the vehicle 20. The relative speed of the vehicle 20 before actuation of the automatic braking system 10 is hereinafter referred to as an initial speed vi.

The distance measuring sensor 11 measures the distance L1 to the obstacle 30. The controller 14 continuously calculates a relative speed v of the vehicle 20 to the obstacle 30, and the collision sensor 12 continuously detects the presence or absence of a collision (S20 of FIG. 3).

The controller 14 performs judgment processing including a presence judgment for judging the presence or absence of the obstacle 30 and an attribute judgment for judging an attribute of the obstacle 30 on the basis of the sensing signal from the distance measuring sensor 11, in other words, the controller 14 performs judgment processing of attribute judgement as to whether the obstacle 30 is a person, an object, or the others (S30 in FIG. 3). If the obstacle 30 is judged to be present in the judgment processing, the TTC is calculated together with the distance L1 (see FIG. 1) from the vehicle 20 to the obstacle 30 and the relative speed v to the obstacle 30. If the calculated TTC is equal to or less than a predetermined threshold value, or is just less than the predetermined threshold value, the controller 14 actuates the braking mechanism 25. By doing so, the automatic braking system 10 brakes the vehicle 20 being in a driving state (S40 in FIG. 3). On the other hand, if there is judged to be no obstacle 30 in the judgment processing, the judgment processing is performed repeatedly. In other words, the judgment processing is performed until the obstacle 30 is judged to be present.

Note that the number of the threshold values may be one or two or more. If there are a plurality of threshold values, operation may be performed as follows. First, the braking mechanism 25 is actuated if the calculated TTC is less than a higher one of the threshold values. Then, if the calculated TTC is between the higher one and a lower one of the threshold values, in other words, time required for the vehicle 20 of the relative speed v to arrive at the obstacle 30 is relatively long, the braking mechanism 25 is actuated with a relatively low braking force BK1. If the calculated TTC is less than the lower one of the threshold values, in other words, time required for the vehicle 20 of the relative speed v to arrive at the obstacle 30 is relatively short, the braking mechanism 25 is actuated with a higher braking force BK2 than the braking force BK1. The braking force of the braking mechanism 25 may be a depressing amount of a brake pedal, for example.

After that, speed judgment processing is performed to judge whether or not the vehicle 20 is stopped, in other words, whether or not the speed of the vehicle 20 read from the speed sensor 13 is "0" (S50 of FIG. 3). If the speed of the vehicle 20 read from the speed sensor 13 is "0," the operation goes to S60 of FIG. 3. If the speed of the vehicle 20 read from the speed sensor 13 is not "0," the operation goes to S40 of FIG. 3.

Next, the controller 14 performs collision judgment processing to judge the presence or absence of a collision on the basis of a detection signal from the collision sensor 12 (S60 of FIG. 3). If it is judged that a collision with the obstacle 30 has occurred, the controller 14 stores to the memory 15 a value (for example, "1") that indicates the presence of the collision as a collision dummy variable Cdv(vi) of the initial speed vi (S70 of FIG. 3). The controller 14 also stores to the memory 15 a value of the relative speed v of the vehicle 20 at the time of detecting the collision as a collision speed vc(vi) of the vehicle 20 having the initial speed vi (S80 of FIG. 3). On the other hand, if it is judged that no collision has occurred with the obstacle 30, the controller 14 stores to the memory 15 a value (for example, "0") that indicates the absence of the collision as the collision dummy variable Cdv(vi) of the initial speed vi (S75 of FIG. 3). Note that, if it is judged that no collision has occurred, the controller 14 may set a value of the collision speed vc(vi) of the vehicle 20 having the initial speed vi at "0" or "blank." Here, in an assessment method for the automatic braking systems, the value of the collision speed vc(vi) of the vehicle 20 having the initial speed vi is preferably set at "0" if data of no collision is included in subjects of a regression analysis, whereas the value of the collision speed vc(vi) of the vehicle 20 having the initial speed vi is preferably set at "blank" if data of no collision is not included in the subjects of the regression analysis.

In this manner, an operation verification result, which includes a result identifier for identifying the individual operation verification result and experiment data associated with the result identifier, is stored in the memory 15. The experiment data includes the initial speed vi, the collision dummy variable Cdv(vi) of the initial speed vi, and the collision speed vc(vi) of the initial speed vi.

Figure 4:
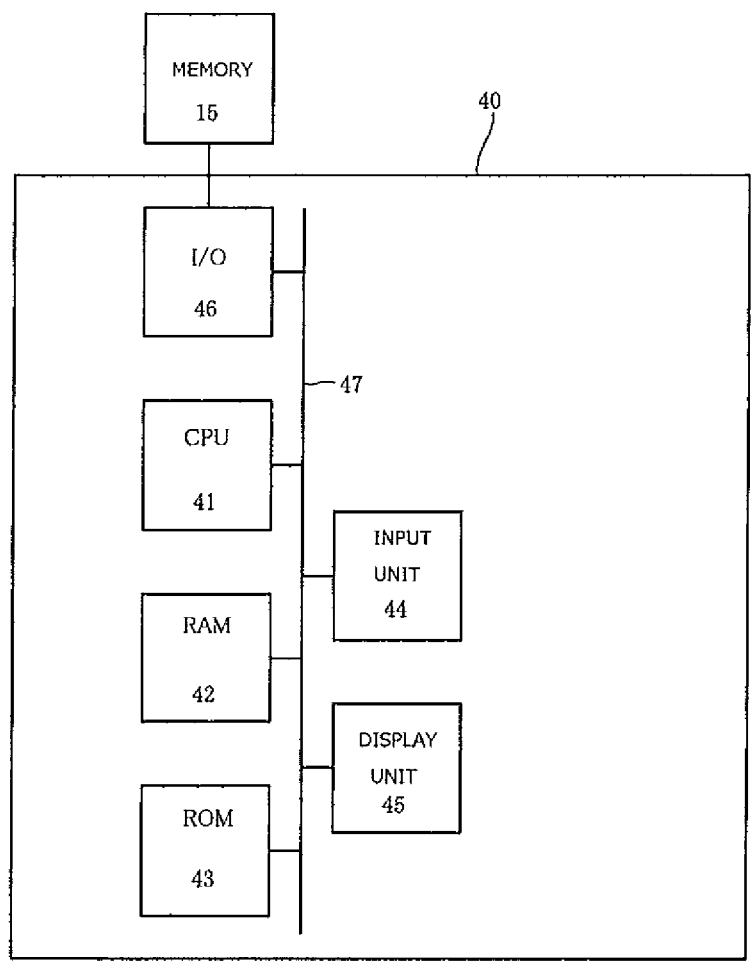
FIG. 4 is a block diagram showing a summary of the assessment device for the automatic braking system.

Then, if a sufficient number of operation verification data is obtained in S90 of FIG. 3, the operation verification is completed. If the sufficient number of operation verification data is not obtained, the operation goes back to S10 of FIG. 3, and the operation verification is newly performed. Note that, in newly performing the operation verification, a reset operation is sometimes performed before the new operation verification, depending on the type of the automatic braking system 10. In the reset operation, for example, the engine 21 is restarted. As shown in FIG. 4, an assessment device 40 for the automatic braking systems (hereinafter simply called assessment device) assesses the automatic braking system 10 on the basis of the operation verification data obtained as described above. The assessment device 40 is provided with a CPU 41, RAM 42, ROM 43, an input unit 44, a display unit 45, an input/output interface 46, and a bus 47.

The CPU (central processing unit) 41 executes various programs to perform various functions of the assessment device 40. The RAM (random access memory) 42 is used as work space of the CPU 41. The ROM (read only memory) 43 stores a basic OS and the various programs (for example, an assessment support program for the automatic braking systems) executed by the CPU 41.

The input unit 44 includes input keys, a keyboard, and a mouse to input various types of information. The display unit 45 is a display for displaying various operating states. Through the input/output interface 46, electric power and control signals for operating the memory 15 are inputted and outputted. The bus 47 is wiring for integrally connecting the CPU 41, the RAM 42, the ROM 43, the input unit 44, the display unit 45, the input/output interface 46, and the like to establish communications.

When the CPU 41 executes the basic OS and the various programs stored in the ROM 43, as shown in FIG. 2, the assessment device 40 functions as a regression analysis execution unit 40A for performing the regression analysis on the basis of the operation verification result, a significance probability calculation unit 40B for calculating a significance probability relating to a regression analysis result, an assessment unit 40C for assessing the automatic braking system 10, and an assessment subject judgment unit 40D. The assessment subject judgment unit 40D judges on the basis of the significance probability calculated from the regression analysis whether or not the regression analysis is included in the subjects of the assessment of the automatic braking system 10, and links the calculated significance probability to the result of the regression analysis. Furthermore, the assessment device 40 also functions as a screening unit 40E for sorting the operation verification results having the occurrence of a collision into a plurality of groups, and a setting unit 40F for setting a screening condition. Note that, details on the screening unit 40E and the setting unit 40F will be described later.

The assessment method for the automatic braking systems performed by the assessment device 40 will now be described.

Figure 5:
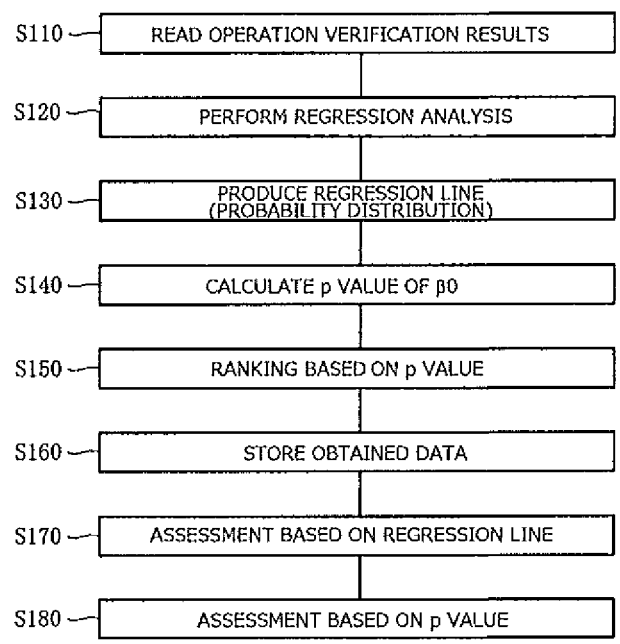
FIG. 5 is a flowchart showing a summary of an analysis of an operation verification result obtained by the operation verification.

The regression analysis execution unit 40A reads out the operation verification results extracted on the basis of a predetermined condition from the memory 15 in which the plurality of operation verification results are stored (S110 of FIG. 5). Then, the regression analysis execution unit 40A extracts the initial speed vi and the collision dummy variable Cdv(vi) of the initial speed vi from the experiment data of the read operation verification results, and performs the predetermined logistic regression analysis (S120 of FIG. 5). In the logistic regression analysis, an explanatory variable is the initial speed vi, and a response variable is the collision dummy variable Cdv(vi).

Moreover, the regression analysis execution unit 40A outputs a result of the logistic regression analysis, that is, data of regression lines 51 to 56 (see FIGS. 6A to 6C) to the display unit 45 (S130 of FIG. 5). The regression lines 51 to 56 represent distributions of a probability P(vi) that the vehicle having the initial speed vi collides with the obstacle. In this manner, the regression lines obtained by the logistic regression analysis are displayed on the display unit 45. Note that, the regression analysis execution unit 40A may store data of the obtained regression lines in the memory 15.

Next, the significance probability calculation unit 40B calculates the significance probabilities of the regression lines 51 to 56 (S140 of FIG. 5). The occurrence probability P(vi) of an event (hereinafter called collision occurrence event) in which the vehicle having the initial speed vi collides with the obstacle is represented by the following mathematical formula 1. In the right-hand side of the mathematical formula 1, a variable β0 is a maximum likelihood estimate of a constant, and a variable β1 is a maximum likelihood estimate of a regression coefficient.

$$\ln\left[\frac{P(vi)}{1-P(vi)}\right] = \beta 0 + \beta 1 \cdot vi \qquad \text{Formula 1}$$

The variables β0 and β1 in the mathematical formula 1 are estimated from data (vi and Cdv) of n-times experiments under a certain condition as values (maximum likelihood estimates) that maximize a likelihood function 1 of the mathematical formula 2.

$$1(\beta) = \prod_{j=1}^{n} P(vi)^{Cdv} \cdot \{1 - P(vi)\}^{1-Cdv} \qquad \text{Formula 2}$$

An example of calculation results of the variables β0 and β1 in experiments 1 to 6 is shown below. In the experiments 1 to 6, the operation verification was performed with changing a combination of the type of the vehicle and the type of the obstacle. Table 1 shows the types (A to C) of the vehicles and the types (1 to 4) of the obstacles used in the experiments 1 to 6.

|  | Vehicle | Obstacle | p value of β0 | OR = $e^{\beta}_1$ | Subject of Assessment | Rank |
|---|---|---|---|---|---|---|
| Experiment 1 | A | 1 | 0.019 | 1.026 | ○ | 1 |
| Experiment 2 | A | 2 | 0.0053 | 1.217 | ○ | 2 |
| Experiment 3 | B | 1 | 0.085 | 1.169 | x | 0 |
| Experiment 4 | B | 3 | 0.021 | 1.483 | ○ | 1 |
| Experiment 5 | C | 1 | 0.228 | 1.082 | x | 0 |
| Experiment 6 | C | 4 | 0.017 | 1.102 | ○ | 1 |

Here, the distance measuring sensor 11 installed in the vehicles A and C is constituted by a camera and a radar. The distance measuring sensor 11 installed in the vehicle B is constituted only by a stereo camera. The obstacle 1 is a black dummy. The obstacle 2 is identical to the obstacle 1 except for color (flesh-color). The obstacle 3 is identical to the obstacle 1 except for color (flesh color). The obstacle 4 has higher radar reflectivity than the obstacle 1.

Table 2 shows the significance probabilities (p values) of the variables β0 and β1 regarding the experiment 1.

TABLE 2

| Variable | Coeff. | Std. Err | Z | p |
|---|---|---|---|---|
| β 0 | −8.123 | 3.461 | −2.347 | 0.019 |
| β 1 | 0.2611 | 0.117 | 2.228 | 0.026 |

In a like manner, Tables 3 to 7 show the significance probabilities (p values) of the variables β0 and β1 regarding the experiments 2 to 6, respectively.

TABLE 3

| Variable | Coeff. | Std. Err | Z | p |
|---|---|---|---|---|
| β 0 | −4.278 | 1.533 | −2.791 | 0.0053 |
| β 1 | 0.196 | 0.065 | 3.013 | 0.0026 |

TABLE 4

| Variable | Coeff. | Std. Err | Z | p |
|---|---|---|---|---|
| β 0 | −2.167 | 1.258 | −1.72 | 0.085 |
| β 1 | 0.156 | 0.064 | 2.44 | 0.015 |

TABLE 5

| Variable | Coeff. | Std. Err | Z | p |
|---|---|---|---|---|
| β 0 | −0.7880 | 3.422 | −2.30 | 0.021 |
| β 1 | 0.394 | 0.166 | 2.37 | 0.018 |

TABLE 6

| Variable | Coeff. | Std. Err | Z | p |
|---|---|---|---|---|
| β 0 | −1.053 | 0.874 | −1.205 | 0.228 |
| β 1 | 0.079 | 0.036 | 2.207 | 0.027 |

TABLE 7

| Variable | Coeff. | Std. Err | Z | p |
|---|---|---|---|---|
| β 0 | −2.834 | 1.192 | −2.378 | 0.017 |
| β 1 | 0.097 | 0.040 | 2.444 | 0.015 |

As shown in FIG. 2, the assessment subject judgment unit 40D judges whether or not the calculated p value of the variable β0 is larger than a predetermined threshold value $p_{th}$ (for example, 0.05). If the calculated p value is judged to be larger than the predetermined threshold value $p_{th}$, the assessment subject judgment unit 40D regards the regression line as unreliable, and eliminates the regression line from the subjects of the assessment of the automatic braking system 10. If the calculated p value is judged to be equal to or less than the predetermined threshold value $p_{th}$, on the other hand, the assessment subject judgment unit 40D regards the regression line as reliable, and includes the regression line in the subjects of the assessment of the automatic braking system 10 (S150 of FIG. 5). Note that, the threshold value $p_{th}$ may be appropriately set depending on a purpose. For example, if the threshold value $p_{th}$ is 0.05, the experiments 3 and 5 are eliminated from the subjects of the assessment, because the p values of the variables β0 of the experiments 3 and 5 are larger than the threshold value $p_{th}$. On the other hand, since the p values of the variables β0 of the experiment results 1, 2, 4, and 6 are equal to or less than the threshold value $p_{th}$, the experiment results 1, 2, 4, and 6 are included in the subjects of the assessment.

After that, the assessment subject judgment unit 400 adds data of the calculated p values of the variables β0 and β1 and data of the judgment results by the assessment subject judgment unit 40D to the data of the regression lines, and stores integral data in the memory 15 (S160 of FIG. 5).

The assessment unit 40C makes assessments of the automatic braking systems on the basis of the regression lines that are included in the subjects of the assessments (S170 of FIG. 5).

Figure 7:
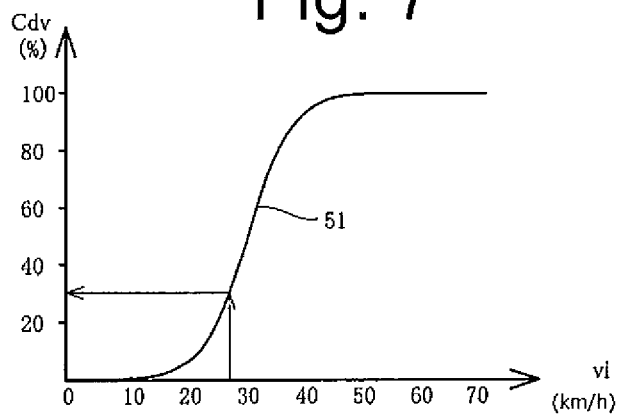
FIG. 7 is a graph showing a summary of a regression line obtained by a regression analysis of experiment data of the operation verification, in which a horizontal axis represents the initial speed vi and a vertical axis represents a collision dummy variable Cdv.

As shown in FIG. 7, as to the regression line 51 to be considered as the subject of the assessment, the assessment unit 40C assesses that a collision avoidance capability of the automatic braking system increases with a decrease in the value of the collision dummy variable Cdv(vi) in a predetermined range of the initial speed vi. In this manner, the assessment unit 40C can assess the collision avoidance capability of the automatic braking system in a certain range of the initial speed vi on the basis of the value of the collision dummy variable Cdv(vi).

Figure 8:
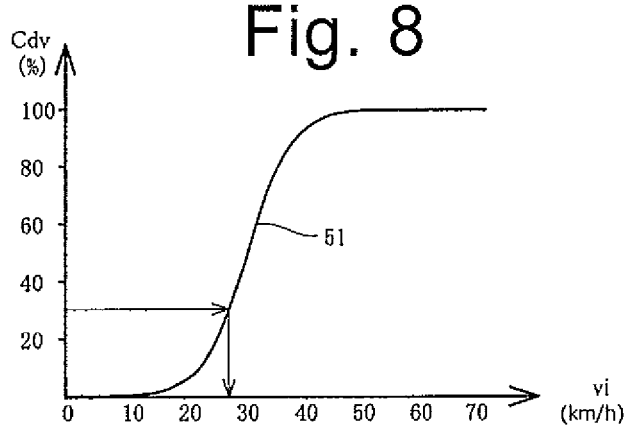
FIG. 8 is a graph showing the summary of the regression line obtained by the regression analysis of the experiment data of the operation verification, in which the horizontal axis represents the initial speed vi and the vertical axis represents the collision dummy variable Cdv.

Note that, as shown in FIG. 8, as to the regression line 51 to be considered as the subject of the assessment, the assessment unit 40C may assess that an impact of a collision on the obstacle decreases, in other words, a serious accident avoidance capability of the automatic braking system as the subject of the assessment increases with a decrease in the value of the initial speed vi in a predetermined range of the collision dummy variable Cdv(vi). In this manner, the automatic braking system can be assessed on the basis of the value of the initial speed vi in the certain range of the collision dummy variable Cdv(vi).

By the way, the automatic braking system 10 is provided with the distance measuring sensor 11 for detecting the obstacle, a judging unit (controller 14) for judging the presence or absence of the obstacle on the basis of the sensing signal of the sensor, and a brake actuating unit (controller 14) for actuating the braking mechanism 25 on the basis of a judgment result of the judging unit. Thus, it is conceivable that the detection of the obstacle by the distance measuring sensor 11 actuates a brake at a certain rate. However, in the actual automatic braking system 10, there are often cases where a collision with the obstacle occurs without reducing speed. This fact indicates that the collision avoidance function of the automatic braking system 10 has certain instability, and a factor of the instability is the function of detecting the obstacle.

For example, an automatic braking system of this type has an obstacle sensor (camera, radar, or the like), a judging unit, and a control unit, and sequentially performs according to a predetermined program, detection processing by the obstacle sensor during driving of the vehicle, obstacle judgment processing based on a sensing result (image data, a reflected wave, or the like), and brake actuating processing based on a judgment result. Accordingly, there are the following three events (event α to event γ) as events in the automatic braking systems, and most of all, "event γ in which a brake was never actuated" is an event specific to the automatic braking systems.

Event α: the brake actuating processing was performed normally, and resulted in no collision.

Event β: although the brake actuating processing was performed normally, a collision occurred.

Event γ: no brake actuating processing was performed, and a collision occurred.

As described above, to assess the performance of the automatic braking systems, which include the certain instability in brake actuation, it is required to assess not only the events α and β but also the event γ in a comprehensive manner.

The automatic braking systems, which include the instability in the collision prevention function, have the problem of how much instability should be allowed as the automatic braking systems, and the problem of how to make up criteria for safety assessment of the automatic braking systems.

The present invention represents the assessment of the performance of the automatic braking system by the probability by using the predetermined regression analysis, and hence can solve the above problems.

Since in the assessment of the automatic braking system like this, the regression line i.e. the probability distribution obtained by the predetermined regression analysis is used, the probability distribution requires certain accuracy. This is because even if the assessment is made with the use of the probability distribution with low accuracy, an assessment result is not appropriate. Moreover, the automatic braking system itself to be assessed has the certain instability, it is required to eliminate a factor of the instability as much as possible other than the instability of the automatic braking system itself, in the assessment of the automatic braking system using the probability distribution.

Accordingly, in the present invention, the p values of the variables $\beta 0$ and $\beta 1$ are considered in the assessment of the automatic braking system. In other words, the assessment unit 40C assesses that the reliability of the probability distribution increases with a decrease in the p value of the probability distribution being the subject of the assessment (S180 of FIG. 5). As described above, the present invention makes the assessment of the automatic braking system in consideration of the p value together with the probability distribution, and therefore it is possible to obtain the assessment result of the automatic braking system with high accuracy.

More specifically, the present invention employs as a preferred embodiment a new idea that the stability of the collision avoidance capability of the automatic braking system can be judged with the use of the p value (significance probability) of the maximum likelihood estimate $\beta 0$ of the constant in the right-hand side of the mathematical formula 1.

For example, as shown in Table 1, in the experiments (experiments 1, 3, and 5) as to the obstacle 1, the p value of the experiment 1 is less than the predetermined threshold value $p_{th}$ (=0.05), although the p values of the experiments 3 and 5 are more than the predetermined threshold value $P_{th}$. Therefore, the result of the experiment 1 is included in the subjects of the assessment of the automatic braking system (indicated with a circle in Table 1), although the results of the experiments 3 and 5 are excluded from the subjects of the assessments of the automatic braking systems (indicated with crosses in Table 1).

In the experiments (experiments 1 and 2) as to the vehicle A, both of the p values of the experiments are less than the threshold value $p_{th}$, both of the results are included in the subjects of the assessment (indicated with circles in Table 1). Furthermore, the p value in the case of the obstacle 1 (experiment 1) is larger than the p value in the case of the obstacle 2 (experiment 2). Therefore, it is assessed that instability owing to a combination of the distance measuring sensor installed in the vehicle A and the obstacle is higher in the experiment result 1 than in the experiment result 2.

In this manner, in the assessment of the automatic braking system, the instability in the collision avoidance function of the automatic braking system can be assessed with high accuracy by using the p value of the variable $\beta 0$ as an indicator.

Also, in the case of comparing the different automatic braking systems, experiment results that have similar p values of the variable $\beta 0$ are preferably compared with each other. For example, the assessment subject judgment unit 40D ranks the automatic braking systems on the basis of the p values of the variable $\beta 0$, and includes the probability distributions that belong to a predetermined rank in the subjects of the assessment. As a result, the assessment unit 40C compares the occurrence probabilities of the collision events that belong to the same rank with each other. Therefore, it is possible to make an assessment of the collision avoidance capability of the automatic braking system with higher accuracy.

An example of conditions for ranking based on the p value of the variable β0 is shown below, and Table 1 shows ranking results as to the experiments 1 to 6.
Rank 0: p value>0.05
Rank 1: 0.01<p value≤0.05
Rank 2: 0.001≤p value≤0.01

Note that, the significance probability calculation unit 40B may output the calculated p values of the variables β0 and β1 and the ranking results to the display unit 45 as indicators of the assessment of the automatic braking system 10.

Figure 9:
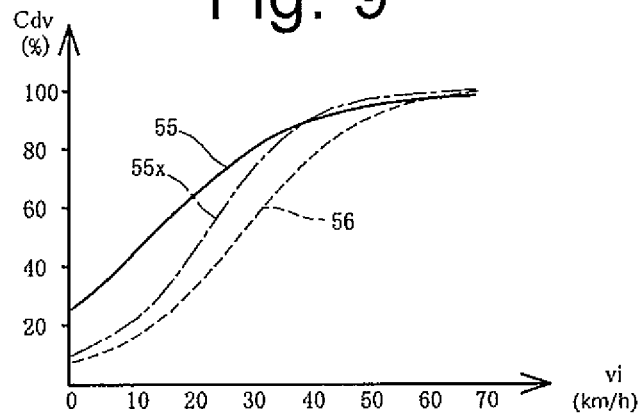
FIG. 9 is a graph showing a distribution of the collision occurrence probability, in which a vertical axis represents the occurrence probability of the collision occurrence event and a horizontal axis represents the initial speed vi, a solid line is obtained from the experiment 5 (initial population), and a broken line is obtained from the experiment 5 (entire population)

In the above embodiment, the logistic regression analysis is performed on the operation verification results that belong to a predetermined population (called initial population) to obtain a specified probability distribution (called initial probability distribution), but the logistic regression analysis may be performed on the operation verification results that belong to an entire population, in which another population is added to the initial population, to obtain another probability distribution (called entire probability distribution). For example, in a case where an initial population of the experiment 6 includes thirty operation verification results, a new population having other thirty operation verification results is added to the initial population to make an entire population. Then, the regression analysis execution unit 40A performs the logistic regression analysis on the entire population to obtain an entire probability distribution (entire regression line 55x shown in FIG. 9). Here, the assessment unit 40C may judge whether or not a profile of the entire regression line 55x has the same trend as an initial regression line (initial regression line 55 shown in FIG. 9) of the experiment 6. As a method for judging whether or not the two regression lines have the same trend, for example, provided that arbitrary functions F1 and F2 represent the two regression lines, respectively, the two regression lines may be judged to have the same trend if |F1−F2| is equal to or less than a predetermined threshold value. The two regression lines may be judged to have different trends if |F1−F2| exceeds the predetermined threshold value.

Note that, in this specification, "population" includes a collective of finite samples.

Furthermore, in a case where both of the profiles are judged to have the same trend, if a p value of the entire probability distribution (entire regression line 55x shown in FIG. 9) is less than a p value of the initial regression line (initial regression line 55 shown in FIG. 9), the assessment unit 40C regards that a shortage of the number of data in the initial population causes an increase in the p value of the probability distribution of the initial population, in other words, degrades accuracy.

In the above embodiment, the binomial logistic regression analysis is performed on two events i.e. the collision occurrence event and the collision non-occurrence event. However, the present invention is not limited to this, and a polynomial logistic analysis may be performed on three or more events. As an example of this, a method for assessing the automatic braking systems in terms of a high-risk collision avoidance capability will be described below.

The method for assessing the automatic braking systems in terms of the high-risk collision avoidance capability includes a screening step, an analyzing step, and an assessing step. In the screening step, the operation verification results are sorted in two groups of the collision occurrence event and the collision non-occurrence event. Then, the collision occurrence event is sorted into a low-risk collision event (light collision event) in which the collision produces a light adverse effect and a high-risk collision event (serious collision event) in which the collision produces a serious adverse effect. In the analyzing step, the polynomial logistic analysis is performed on the three events, to obtain an occurrence probability of each event. In the assessing step, the automatic braking system is assessed in terms of the high-risk collision avoidance capability, on the basis of an integrated value of the obtained occurrence probability of each event.

The details of each step will be described below.

In the screening step, the setting unit 40F (see FIG. 2) chooses one of screening conditions stored in the memory 15 in accordance with an output signal from the controller 14 or the input unit 44 (see FIG. 4). Then, the screening unit 40E reads the operation verification results from the memory 15, and extracts the operation verification results corresponding to the collision occurrence event from the read operation verification results. Furthermore, the screening unit 40E sorts the extracted operation verification results in two groups of the light collision event and the serious collision event in accordance with the screening condition chosen by the setting unit 40F. Moreover, the screening unit 40E applies the identification variable Y for identifying a sort result to each of the operation verification results belonging to the events.

For example, when the identification variables Y for identifying the serious collision event, the light collision event, and the collision non-occurrence event are defined as follows:
Serious collision event: Y=0
Light collision event: Y=1
Collision non-occurrence event: Y=2,
the screening unit 40E sets a value of the identification variable Y of "0" to the serious collision event, a value of the identification variable Y of "1" to the light collision event, and a value of the identification variable Y of "2" to the collision non-occurrence event.

Next, in the analyzing step, the regression analysis execution unit 40A reads the operation verification results from the memory 15, and performs the predetermined polynomial logistic regression analysis. In the polynomial logistic regression analysis performed in the analyzing step, an explanatory variable is the initial speed vi, and a response variable is an occurrence probability P (mathematical formulas 5 and 6) represented by using functions of mathematical formulas 3 and 4.

$$g_1(x) = \ln\left[\frac{P(Y=1|x)}{P(Y=0|x)}\right] = \beta_{10} + \beta_{11}x \quad \text{Formula 3}$$

$$g_0(x) = 0 \quad \text{Formula 4}$$

$$P(Y=1|x) = \frac{\exp[g_1(x)]}{1+\Sigma\exp[g_1(x)]}(Y \neq 0)\ (i=1,2,3,\cdots) \quad \text{Formula 5}$$

$$P(Y=0|x) = \frac{1}{1+\Sigma\exp[g_1(x)]}(Y=0)\ (i=1,2,3,\cdots) \quad \text{Formula 6}$$

Here, parameters $\beta_{i0}$ and $\beta_{i1}$ in the mathematical formula 3 are calculated from the operation verification results by a maximum likelihood method. The regression analysis execution unit 40A may calculate each of the parameters $\beta_{i0}$ and $\beta_{i1}$ by using the maximum likelihood method. Then, the regression analysis execution unit 40A leads an occurrence probability P of a predetermined event from mathematical formulas 7 and 8.

$$g_1(x) = \ln\left[\frac{P(Y=1\mid x)}{P(Y=0\mid x)}\right] = \beta_{10} + \beta_{11}x \quad \text{Formula 7}$$

$$g_2(x) = \ln\left[\frac{P(Y=2\mid x)}{P(Y=0\mid x)}\right] = \beta_{20} + \beta_{21}x \quad \text{Formula 8}$$

According to this embodiment, if the operation verification results are sorted into the three events (the collision non-occurrence event, the light collision event, and the serious collision event) and the serious collision event is designated as a reference event, the response variable of the polynomial logistic regression analysis in the analyzing step is an occurrence probability P (Y=i|x) (wherein i=0, 1, or 2) represented by using the function of the mathematical formula 7 and the function of the mathematical formula 8 (see mathematical formulas 9 to 11).

Also, the regression analysis execution unit 40A calculates an occurrence probability P (Y=0|x) of the serious collision event, an occurrence probability P (Y=1|x) of the light collision event, and an occurrence probability P (Y=2|x) of the collision non-occurrence event on the basis of the mathematical formulas 7 to 9.

$$P(Y=0\mid x) = \frac{1}{1+\exp[g_1(x)]+\exp[g_2(x)]} \quad \text{Formula 9}$$

$$P(Y=1\mid x) = \frac{\exp[g_1(x)]}{1+\exp[g_1(x)]+\exp[g_2(x)]} \quad \text{Formula 10}$$

$$P(Y=2\mid x) = \frac{\exp[g_2(x)]}{1+\exp[g_1(x)]+\exp[g_2(x)]} \quad \text{Formula 11}$$

Moreover, the regression analysis execution unit 40A outputs the calculated occurrence probability P (Y=i|x) of each event to the display unit 45 (see FIG. 10A).

In the assessing step, the assessment unit 40C calculates integrated values $S_0$, $S_1$, and $S_2$ of the occurrence probabilities P of the events on the basis of mathematical formulas 9s to 11s, respectively.

$$S_0 = \int_0^{70} P(Y=0\mid x)dx \quad \text{Formula 9s}$$

$$S_1 = \int_0^{70} P(Y=1\mid x)dx \quad \text{Formula 10s}$$

$$S_2 = \int_0^{70} P(Y=2\mid x)dx \quad \text{Formula 11s}$$

Note that, a lower end of an integration interval is set at "0," and a higher end thereof is set at "70" in this embodiment. However, the integration interval may be set in accordance with the range of the initial speed vi in which the automatic braking system is assessed.

Next, the assessment unit 40C outputs the integrated values $S_0$, $S_1$, and $S_2$ of the occurrence probabilities P of the respective events obtained by the mathematical formulas 9s to 11s to the display unit 45 (see FIG. 10B). The integrated values $S_0$, $S_1$, and $S_2$ are represented as the size of areas W0, W1, and W2 in FIG. 10B, respectively. Furthermore, the assessment unit 40C stores each of the calculated integrated values $S_0$, $S_1$, and $S_2$ in the memory 15.

Then, the assessment unit 40C makes an assessment of the automatic braking system with the use of these integrated values. To be more specific, it is assessed that the high-risk collision avoidance capability of the automatic braking system increases with an increase in the sum of the integrated value $S_1$ and the integrated value $S_2$, or a decrease in the sum of the integrated value $S_0$ and the integrated value $S_1$. As a matter of course, it may be assessed that the high-risk collision avoidance capability of the automatic braking system increases with a decrease in the integrated value $S_0$ or an increase in the integrated value $S_2$.

As described above, by sorting the collision occurrence event into the light collision event and the serious collision event and then performing the polynomial logistic regression analysis, it is possible to assess the automatic braking system in terms of a capability to avoid the high-risk collision. By sorting the collision occurrence event into the light collision event and the serious collision event and making an analysis, it is possible to assess a capability to avoid the high-risk collision (for example, fatal accident avoidance capability), when compared with an analysis on a sort in two events i.e. the collision occurrence event and the collision non-occurrence event. Since the polynomial logistic regression analysis is employed as an analyzing method of each event, a result of the polynomial logistic regression analysis is consistent with a result of the binomial logistic regression analysis on the two events i.e. the collision occurrence event and the collision non-occurrence event.

Note that, before making an assessment based on the integrated values of the probability distributions, the significance probabilities i.e. the p values of the variables β0 and β1 may be calculated. A judgment as to whether or not the probability distribution is included in the subjects of the assessment may be made on the basis of the magnitudes of the p values, and an assessment of the automatic braking system may be made on the basis of the magnitudes of the p values.

In the above embodiments, the assessment unit 40C makes an assessment of the automatic braking system in consideration of data of the calculated p value of the variable β0, but the present invention is not limited to this. Specifically, the assessment unit 40C may make an assessment of the automatic braking system in consideration of the calculated variable β1.

As shown in the mathematical formula 12, the coefficient β1 of the speed vi in the mathematical formula 1 is a logarithm of variation of odds relative to an increase in a vehicle speed of 1 km/h, in other words, a logarithm of an odds ratio OR. Table 1 shows the odds ratio OR in the experiments 1 to 6.

$$\beta_1 = \ln\left\{\frac{\left[\frac{P(vi+1)}{1-P(vi+1)}\right]}{\left[\frac{P(vi)}{1-P(vi)}\right]}\right\} = \ln(OR) \quad \text{Formula 12}$$

As shown in Table 1, an increase in the odds ratio with an increase in the vehicle speed of 1 km/h is approximately 3% in the vehicle A, approximately 17% in the vehicle B, and approximately 8% in the vehicle C, and hence the odds ratio of the vehicle B is the largest. In other words, if the color of the dummy is changed, variation of the odds ratio is large in the vehicle B, although it is small in the vehicles A and C. Thus, it can be said that the performance (collision avoidance function) of the automatic braking system is relatively robust in the vehicles A and C with respect to condition variation, in comparison with the vehicle B. The difference in robustness is caused by the distance measuring sensor of the vehicle B composed of a single sensor (camera), whereas the distance measuring sensor of the vehicles A and C is composed of a plurality of sensors. In other words, it is possible to assess the robustness of the automatic braking system caused by the distance measuring sensor by considering the variable β1 itself.

Figure 11:
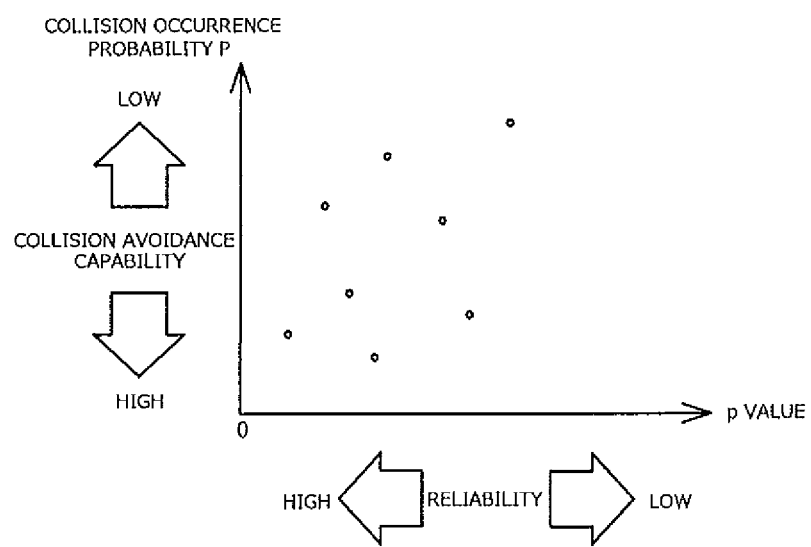
FIG. 11 is a graph in which a vertical axis represents the occurrence probability P and a horizontal axis represents a p value.

As described above, the present invention can assess the collision avoidance capability by using the probability P of occurrence of a collision, as a method for assessing the performance of the automatic braking system. Furthermore, the variables β0 and β1 can be considered in this assessment. Therefore, according to the present invention, it is possible to assess the performance of the automatic braking system in consideration of the probability P of occurrence of a collision and the reliability of the probability P (see FIG. 11). A graph of FIG. 11 shows performance assessment results of the automatic braking systems. This graph shows not only the collision avoidance capability of the plurality of automatic braking systems but also the reliability thereof. Therefore, the present invention is also applicable to automobile assessment.

Note that, as a matter of course, the assessment support program and the assessment support method for the automatic braking systems described above are not limited to the above-described embodiments, and can be variously modified without departing from the scope of the invention.

The assessment support program and the assessment support method for the automatic braking systems described above can uniformly assess the performance of the automatic braking systems, irrespective of the types of the automatic braking systems.

REFERENCE SIGNS LIST 10 automatic braking system
11 distance measuring sensor
12 collision sensor
13 speed sensor
14 controller
15 memory
20 vehicle
21 engine
22 accelerator pedal
23 tire
24 drive shaft
25 braking mechanism
27 steering wheel
30 obstacle
40 assessment device
40A regression analysis execution unit
40B significance probability calculation unit
40C assessment unit
40D assessment subject judgment unit
40E screening unit
40F setting unit

What is claimed is:

1. An assessment support program for an automatic braking system executed by a computer having at least a CPU, the assessment support program executing the following steps:
a regression analysis step making the CPU obtain a probability distribution by a logistic regression analysis with reading out from a memory a result of a test of whether or not a vehicle equipped with the automatic braking system collides with an obstacle under actuation of the automatic braking system; and
an assessment step making the CPU function as a part that constitutes assessment unit that makes an assessment of performance of the automatic braking system on the basis of the probability distribution;

wherein:
an explanatory variable in the logistic regression analysis is a relative speed of the vehicle relative to the obstacle before the actuation of the automatic braking system; and
a response variable in the logistic regression analysis is an occurrence probability of an event in the result of the test.

2. The assessment support program for an automatic braking system according to claim 1, wherein
the assessment unit assesses that instability of the automatic braking system decreases with a decrease in a significance probability of the probability distribution.

3. The assessment support program for an automatic braking system according to claim 2, wherein
by using the following regression formula 1 in which P(vi) represents an occurrence probability of an event relating to the vehicle having the relative speed, β0 represents a maximum likelihood estimate of a constant, and β1 represents a maximum likelihood estimate of a regression coefficient of the relative speed, the assessment unit assesses that instability of the automatic braking system decreases with a decrease in the significance probability of the maximum likelihood estimate β0 of the constant $$\ln\left[\frac{P(vi)}{1-P(vi)}\right] = \beta 0 + \beta 1 \cdot vi. \quad \text{Formula 1}$$

4. The assessment support program for an automatic braking system according to claim 3, wherein
the assessment unit makes an assessment of the performance of the automatic braking system on the basis of the maximum likelihood estimate β1 of the regression coefficient of the relative speed.

5. The assessment support program for an automatic braking system according to claim 4, wherein
the assessment unit assesses that robustness of the automatic braking system increases with a decrease in the maximum likelihood estimate β1 of the regression coefficient of the relative speed.

6. The assessment support program for an automatic braking system according to claim 2, wherein
the event includes a collision non-occurrence event in which the vehicle does not collide with the obstacle, and a collision occurrence event in which the vehicle collides with the obstacle, and
the assessment unit makes an assessment of the performance of the automatic braking system on the basis of a significance probability relating to the collision occurrence event in the probability distribution.

7. The assessment support program for an automatic braking system according to claim 6, wherein
the collision occurrence event includes a first collision occurrence event and a second collision occurrence event, and
the assessment unit makes an assessment of the performance of the automatic braking system on the basis of the significance probability relating to the first collision occurrence event or the second collision occurrence event.

8. The assessment support program for an automatic braking system according to claim 7, wherein
the first collision occurrence event is a light collision occurrence event in which a collision of the vehicle produces a light adverse effect, and the second collision occurrence event is a serious collision occurrence event in which a collision of the vehicle produces a serious adverse effect.

9. The assessment support program for an automatic braking system according to claim 1, wherein
the CPU functions as a part that constitutes an assessment subject judgement unit that judges whether or not the probability distribution is included in subjects of the assessment on the basis of a significance probability relating to the probability distribution.

10. An assessment support program for an automatic braking system executed by a computer having at least a CPU, the assessment support program executing the following steps:
a regression analysis step making the CPU obtain a probability distribution by a logistic regression analysis with reading out from a memory a result of a test of whether or not a vehicle equipped with the automatic braking system collides with an obstacle under actuation of the automatic braking system; and
an assessment step making the CPU function as a part that constitutes an assessment unit that makes an assessment of performance of the automatic braking system on the basis of a logarithm of an odds ratio relating to the probability distribution;
wherein:
an explanatory variable in the logistic regression analysis is a relative speed of the vehicle relative to the obstacle before the actuation of the automatic braking system; and
a response variable in the logistic regression analysis is an occurrence probability of an event in the result of the test.

11. The assessment support program for an automatic braking system according to claim 10, wherein
the assessment unit assesses that robustness of the automatic braking system relative to the relative speed vi increases with a decrease in the logarithm of the odds ratio.

12. The assessment support program for an automatic braking system according to claim 10, wherein
the logarithm of the odds ratio is a maximum likelihood estimate of a regression coefficient of the relative speed vi with respect to the probability distribution obtained by the logistic regression analysis.

13. The assessment support program for an automatic braking system according to claim 10, wherein
the CPU functions as a part that constitutes an assessment subject judgment unit that judges whether or not the probability distribution is included in subjects of the assessment on the basis of a significance probability relating to the probability distribution.

14. An assessment support program for an automatic braking system executed by a computer having at least a CPU, the assessment support program executing the following steps:
a regression analysis step making the CPU obtain a probability distribution by a logistic regression analysis with reading out from a memory a result of a test of whether or not a vehicle equipped with the automatic braking system collides with an obstacle under actuation of the automatic braking system; and
an assessment step making the CPU function as a part that constitutes an assessment unit that makes an assessment of performance of the automatic braking system on the basis of the probability distribution and an assessment subject judgment unit that judges whether or not the probability distribution is included in subjects of the assessment on the basis of a significance probability relating to the probability distribution;
wherein:
an explanatory variable in the logistic regression analysis is a relative speed of the vehicle relative to the obstacle before the actuation of the automatic braking system; and
a response variable in the logistic regression analysis is an occurrence probability of an event in the result of the test.

15. The assessment support program for an automatic braking system according to claim 14, wherein
the assessment subject judgment unit compares the significance probability with a threshold value in magnitude, and excludes the automatic braking system from the subjects of the assessment in a case where the significance probability is larger than the threshold value.

16. The assessment support program for the automatic braking system according to claim 15, wherein
in the following regression formula 1 in which P(vi) represents an occurrence probability of an event relating to the vehicle having the relative speed, β0 represents a maximum likelihood estimate of a constant, and β1 represents a maximum likelihood estimate of a regression coefficient of the relative speed, the assessment subject judgment unit makes a judgment by using the significance probability of the maximum likelihood estimate β0 of the constant $$\ln\left[\frac{P(vi)}{1-P(vi)}\right] = \beta 0 + \beta 1 \cdot vi. \qquad \text{Formula 1}$$

17. The assessment support program for the automatic braking system according to claim 15, wherein
the assessment subject judgment unit adds magnitude comparison result information, which represents a result of the magnitude comparison, to information on the probability distribution, and
includes in subjects of the assessment the probability distributions belonging to the same group, out of the probability distributions sorted into groups on the basis of the magnitude comparison result information.

18. An assessment support device for an automatic braking system having a computer having at least a CPU, comprising:
an assessment unit for making an assessment of performance of the automatic braking system on the basis of a probability distribution, wherein
the probability distribution of the assessment unit is obtained by a logistic regression analysis based on a result of a test of whether or not a vehicle equipped with the automatic braking system collides with an obstacle under actuation of the automatic braking system;
an explanatory variable in the logistic regression analysis is a relative speed of the vehicle relative to the obstacle before the actuation of the automatic braking system; and
a response variable in the logistic regression analysis is an occurrence probability of an event in the result of the test.

* * * * *